July 7, 1931. C. D. BENEDICT 1,813,270
ELECTRICAL HEATER
Filed Jan. 20, 1930 2 Sheets-Sheet 1
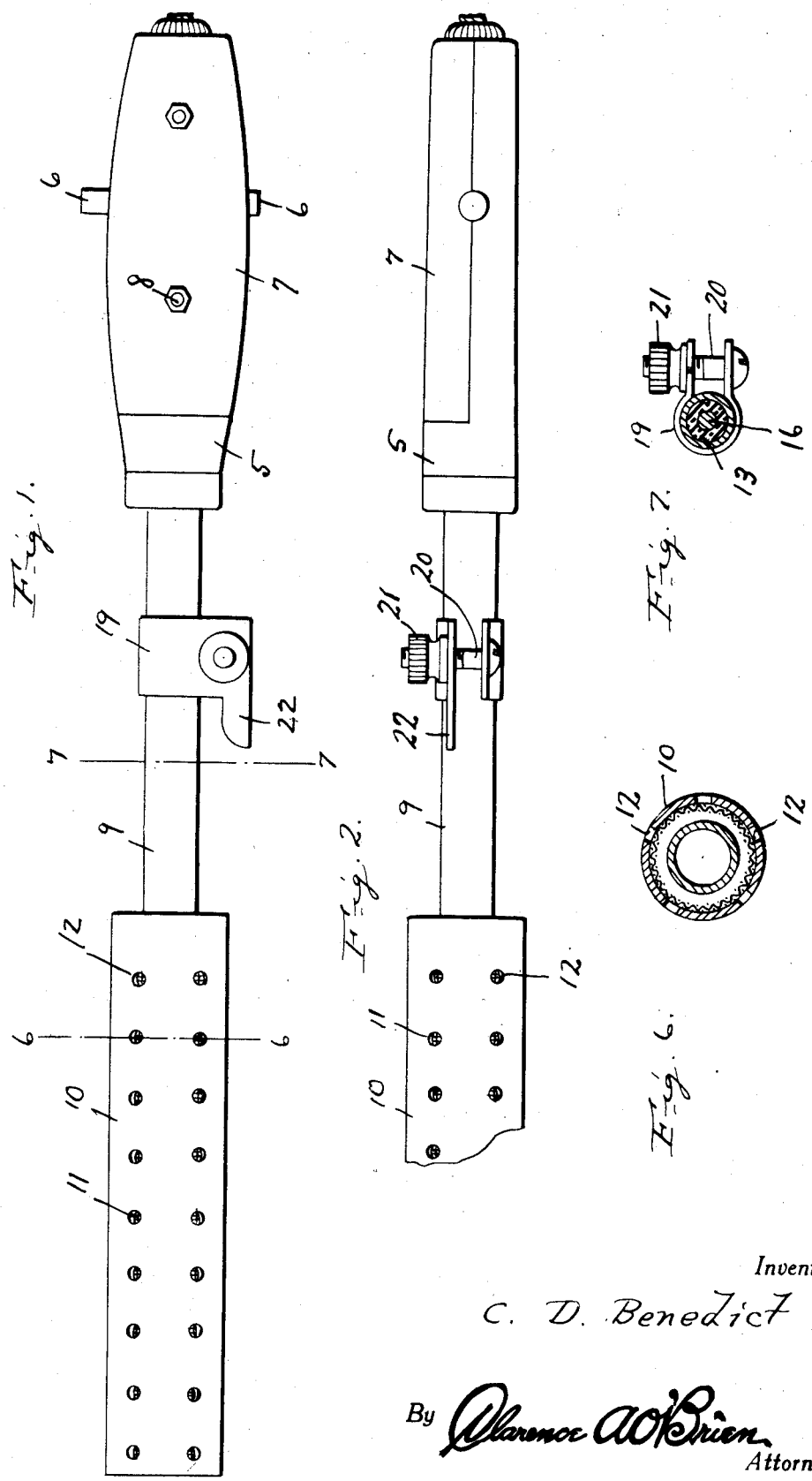
Inventor
C. D. Benedict
By Clarence A O'Brien
Attorney July 7, 1931.  C. D. BENEDICT  1,813,270
ELECTRICAL HEATER
Filed Jan. 20, 1930    2 Sheets-Sheet 2
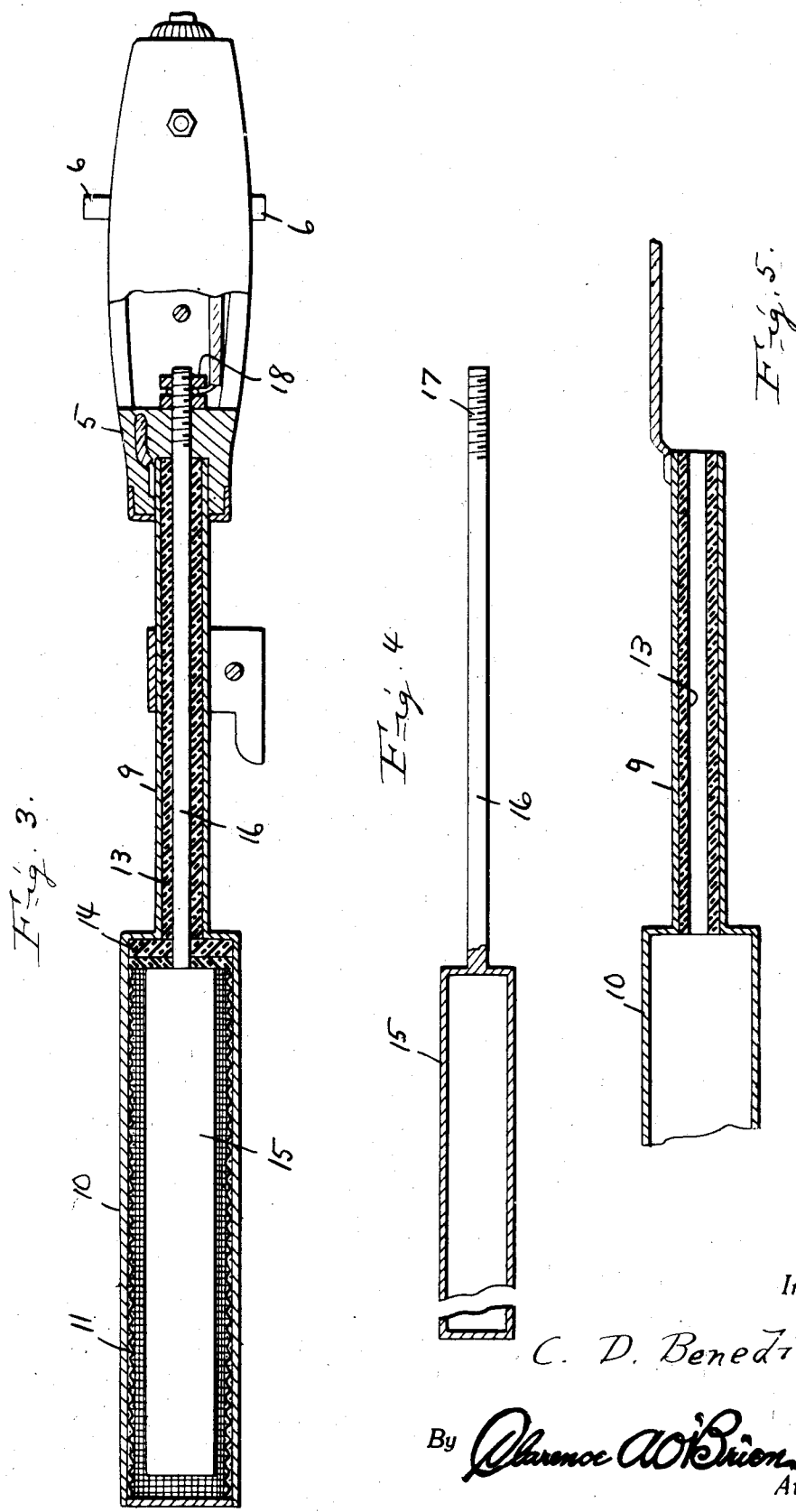

Patented July 7, 1931

1,813,270

UNITED STATES PATENT OFFICE

CHARLES D. BENEDICT, OF STURGIS, KENTUCKY

ELECTRICAL HEATER

Application filed January 20, 1930. Serial No. 422,101.

This invention appertains to new and useful improvements in electrical heating appliances, and more particularly to a novel heater of the immersion type.

The principal object of the invention is to provide a small compact heater that may be readily placed within a small receptacle for heating the liquid contents thereof.

Various other objects of importance, and advantages of the invention will become more apparent to the reader as the specification proceeds hereinafter.

In the drawings:—

Figure 1 represents a side elevational view of the novel heater.

Fig. 2 represents a fragmentary side elevational view of the heater.

Fig. 3 represents a longitudinal sectional view through the heater.

Fig. 4 represents a fragmentary longitudinal sectional view through the inner tube and its shank.

Fig. 5 represents a fragmentary longitudinal sectional view through the outer tube, and its tubular shank.

Fig. 6 represents a cross sectional view taken substantially on the line 6—6 of Fig. 1.

Fig. 7 represents a cross sectional view taken substantially on the line 7—7 of Fig. 1.

Referring to the drawings, wherein like numerals designate like parts, it can be seen that the novel heater includes a hollow handle construction 5 in which a switch structure is mounted (not shown), and equipped with the usual push buttons 6—6.

The handle 5 is of the sectional type, being provided with a removable section 7 that is secured to the handle proper by bolt nuts 8, or in fact, any other suitable means.

Projecting from one end of the handle 5 is a shank 9 of the outer tube 10, the latter forming one electrode of the heater. The outer tube 10 is closed at its inner end in a manner shown in Fig. 3, and has a cylindrical reticulated body 11 mounted therein for preventing the entrance of any foreign matter through the perforations 12 of the outer tube 10.

An elongated bushing 13 of some suitable di-electric material extends throughout the length of the shank 9 abutting at one end the handle 5, and at its opposite end of the insulating shim 14.

Disposed within the confines of the tube 10 is a second tube 15 of hollow construction, and provided with an elongated solid shank 16 projecting from one end thereof. This shank 16 projects through the bushing 13 and is provided with rims 17 at its free ends. Nuts 18 are engaged on the threaded portion of the shank 16 to secure the shanks 16 and 19 to the tube 15 in the tube, as clearly shown in Fig. 3.

Conductors are connected to the shanks 9 and 16 in the manner clearly shown in the drawings. A U-shaped clamp 19, is engageable with the shank 9 in the manner shown in the drawings, and is secured thereto by the bolt 20 and knurled nuts 21. The clamp 19 is provided with a laterally disposed finger 22 which acts as a hook when engaged over the rim of a glass or utensil to support the shank in a vertical position.

It will thus be seen that energy will pass along the shank 16 when the switch is closed, and from the tube 15 through the water to the tube 10 and from there along the shank 9 to the opposite side of the circuit.

It will thus be seen that there can be no overheating of the device when it is not immersed in a liquid, and there is no conducting material between the tubes 10 and 15.

While the foregoing description describes the invention in definite terms, it is to be understood that numerous changes in the shape, size, and materials, may be resorted to without departing from the spirit and scope of the invention as claimed hereinafter.

Having thus described my invention, what I claim as new is:—

1. An electrical heater of the class described comprising a handle having a socket in its inner end, and an opening formed in the handle with a bore connecting the opening with the socket, a perforated cylinder, a tubular shank connected with one end of the cylinder having its other end embedded in the socket, a smaller cylinder located in and spaced from the first cylinder, a shank connected with one end of the small cylinder, and passing through the tubular shank and through the bore in the handle into the opening in the handle, non-conductor material located between the two shanks and insulating them one from the other, a conductor connected to the tubular shank and a conductor connected to the end of the central shank which extends into the opening in the handle.

2. An electrical heater comprising a hollow handle having a socket at one end thereof and a bore connecting the inner end of the socket to the space formed by the hollow handle, a perforated cylinder, a tubular shank connected therewith and having its free end located in the socket, a second cylinder located in the first cylinder and spaced therefrom, a shank connected with one end of the said cylinder and passing through the tubular shank and through the bore in the handle, a circuit including the tubular shank and the solid shank, a switch located in the hollow handle for controlling the circuit, insulating material located in the tubular shank surrounding the solid shank and insulating material located in the inner end of the first cylinder and contacting the inner end of the small cylinder and through which the solid shank passes.

In testimony whereof I affix my signature.

CHARLES D. BENEDICT.